United States Patent
Shapson (10) Patent No.: US 6,969,278 B2
(45) Date of Patent: Nov. 29, 2005

(54) DIRECTLY CONNECTABLE CABLE TELEVISION SPLITTERS/AMPLIFIER

(75) Inventor: Jay F. Shapson, Englishtown, NJ (US)

(73) Assignee: Extreme Broadband Engineering, LLC, Englishtown, NJ (US)

( * ) Notice: Subject to any disclaimer, the term of this patent is extended or adjusted under 35 U.S.C. 154(b) by 60 days.

(21) Appl. No.: 10/827,669

(22) Filed: Apr. 19, 2004

(65) Prior Publication Data

US 2005/0233637 A1   Oct. 20, 2005

(51) Int. Cl.$^7$ .............................................. H01R 9/05
(52) U.S. Cl. ..................... 439/579; 439/63; 333/100
(58) Field of Search ........................ 439/578, 579, 439/581, 63; 333/100, 101, 206

(56) References Cited

U.S. PATENT DOCUMENTS

| | | | |
|---|---|---|---|
| 4,559,421 A | * 12/1985 | Lapke et al. ............... | 200/51.1 |
| 4,648,682 A | 3/1987 | Tubbs ........................ | 339/154 |
| 4,851,609 A | * 7/1989 | Reddy ....................... | 174/35 R |
| 5,482,469 A | * 1/1996 | Seiceanu et al. ............ | 439/188 |
| 5,662,489 A | 9/1997 | Stirling ..................... | 439/322 |
| 5,857,860 A | * 1/1999 | Silliman et al. ............ | 439/171 |
| 6,074,250 A | * 6/2000 | Tang .......................... | 439/579 |
| 6,133,939 A | * 10/2000 | Gresko et al. .............. | 725/127 |
| 6,261,125 B1 | * 7/2001 | Yeh ............................ | 439/579 |
| 6,292,371 B1 | * 9/2001 | Toner, Jr. ................... | 361/752 |
| 6,755,665 B2 | * 6/2004 | Lu .............................. | 439/63 |

* cited by examiner

*Primary Examiner*—Hien Vu
(74) *Attorney, Agent, or Firm*—Kenneth Watov; Watov & Kipnes, P.C.

(57) ABSTRACT

In one embodiment of the invention a splitter is provided with a male F-59 type connector for direct connection to the female port of a video amplifier. In another embodiment of the invention, a cable televison amplifier is provided with a male F-59 type connector for direct connection to the female input port of a typical splitter.

13 Claims, 8 Drawing Sheets

FIG. 9

DIRECTLY CONNECTABLE CABLE TELEVISION SPLITTERS/AMPLIFIER

FIELD OF THE INVENTION

The field of the present invention relates generally to cable television devices, and more particularly to cable television splitters and amplifiers.

BACKGROUND OF THE INVENTION

Known cable television splitters typically have a housing with a plurality of female F-connectors for receiving a male F-connector on the end of a 75 ohm RF coaxial cable. In a typical configuration, one of the female F-connectors of the splitter is associated with an input port, and the remainder of the female F-connectors are associated with output port signal connections. Also, a typical cable television RF amplifier includes protruding from the housing three female F-type coaxial cable connectors also for termination to a male F-connector at the end of a coaxial cable for connection to other devices, with one of the female F Connectors being associated with receiving an input signal, another with receiving power, and a third for providing amplified output signals for connection via 75 ohm RF cable to the input of a television set, for example. In such typical usage of cable television amplifiers and splitters, it is necessary to use a 75 ohm RF cable with male connectors attached to each end for interconnecting the female connectors between the output of a splitter, for example, and the input of another device, or between the input to a splitter and the output of an amplifier, for example. In many applications, it would be desirable if the interconnecting cables can be eliminated, in order to both reduce interconnection time, and also reduce the signal losses and distortion that may occur through the use of cables to interconnect devices, as indicated.

SUMMARY OF THE INVENTION

In order to overcome the use of interconnecting cables for connecting a cable television splitter device to an amplifier, for example, in one embodiment of the invention, a splitter includes a male connector with a captive rotatable nut for providing an input port for direct connection to the female port at the output of a typical cable television video amplifier. The splitter in the various embodiments of the invention also includes a plurality of female ports for outputting video signals split off from the input signal. In another embodiment of the invention, a cable television video amplifier includes a male connector with a captive nut at the output port of the amplifier for direct connection to the female input connector of a typical cable television splitter, for example.

BRIEF DESCRIPTION OF THE DRAWINGS

Various embodiments of the present invention are described below in detail with reference to the drawings, in which like items are indicated by the same reference designation, wherein.

DETAILED DESCRIPTION OF THE PREFERRED EMBODIMENTS OF THE INVENTION

Figure 1:
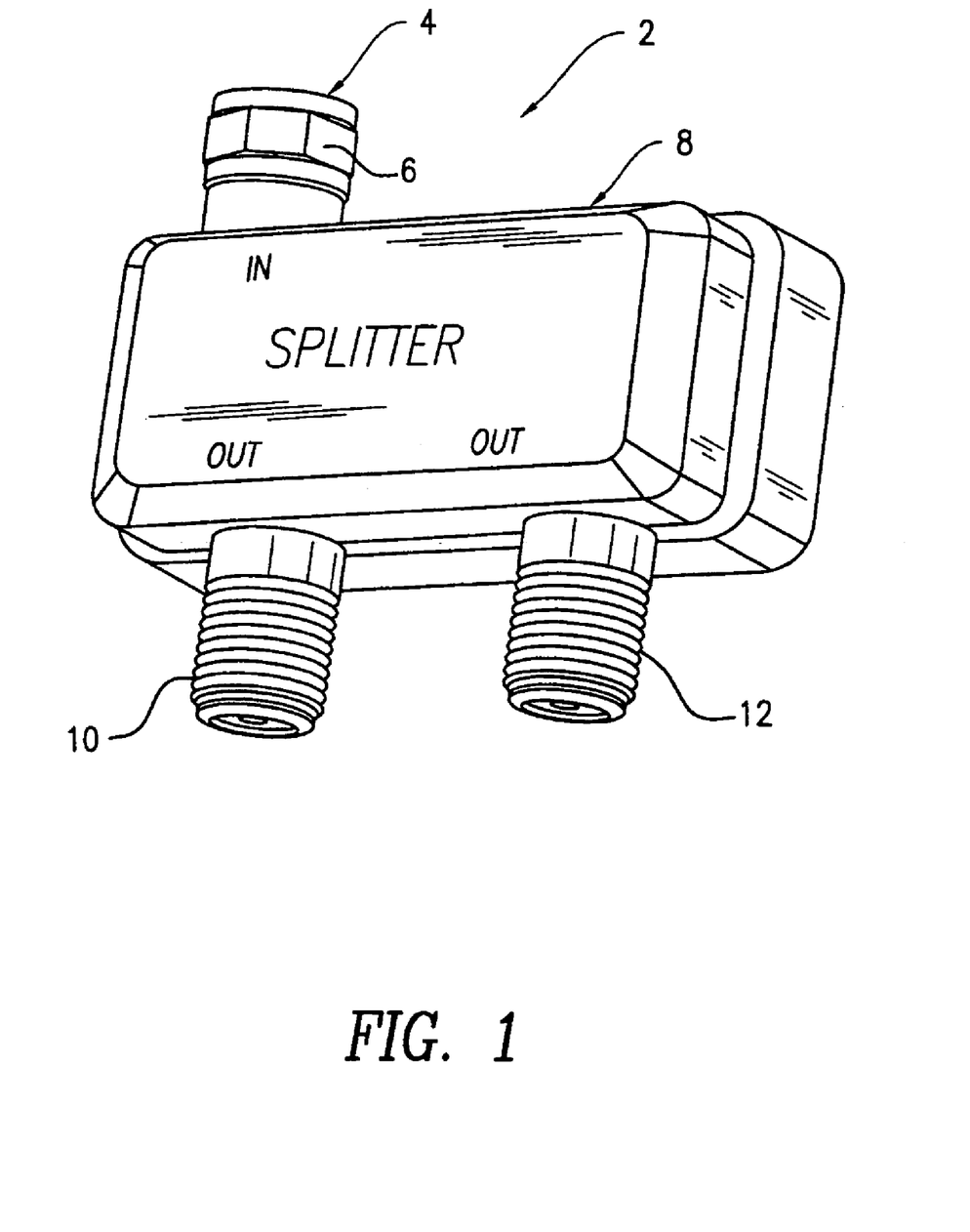
FIG. 1 is a pictorial diagram of a two output splitter including a male connector with a captive nut as an input port, for one embodiment of the invention.
Figure 2:
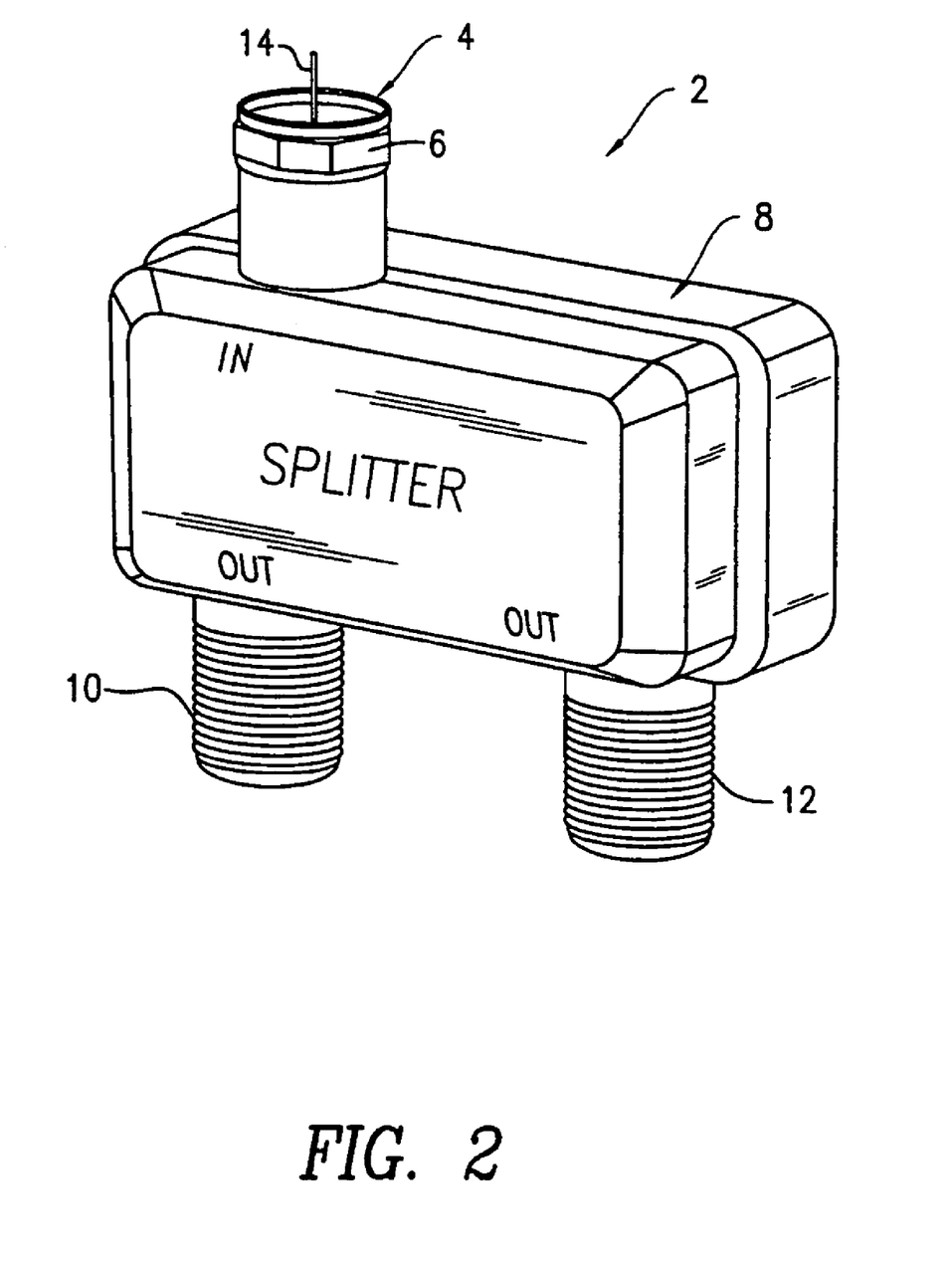
FIG. 2 is a pictorial diagram of the splitter of FIG. 1 viewed from a different direction.
Figure 3:
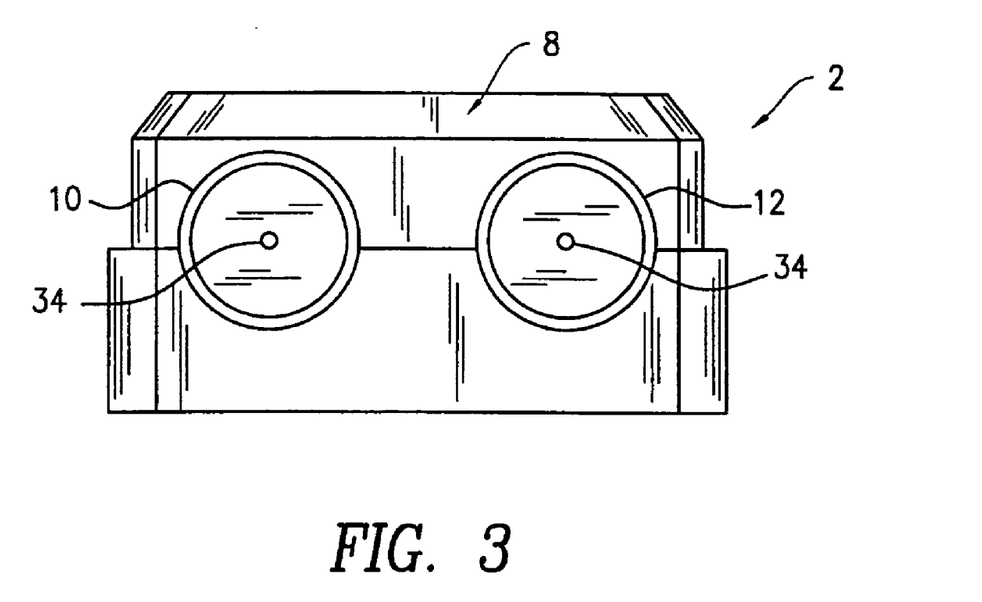
FIG. 3 is a bottom plan view of the splitter of FIG. 1.
Figure 4:
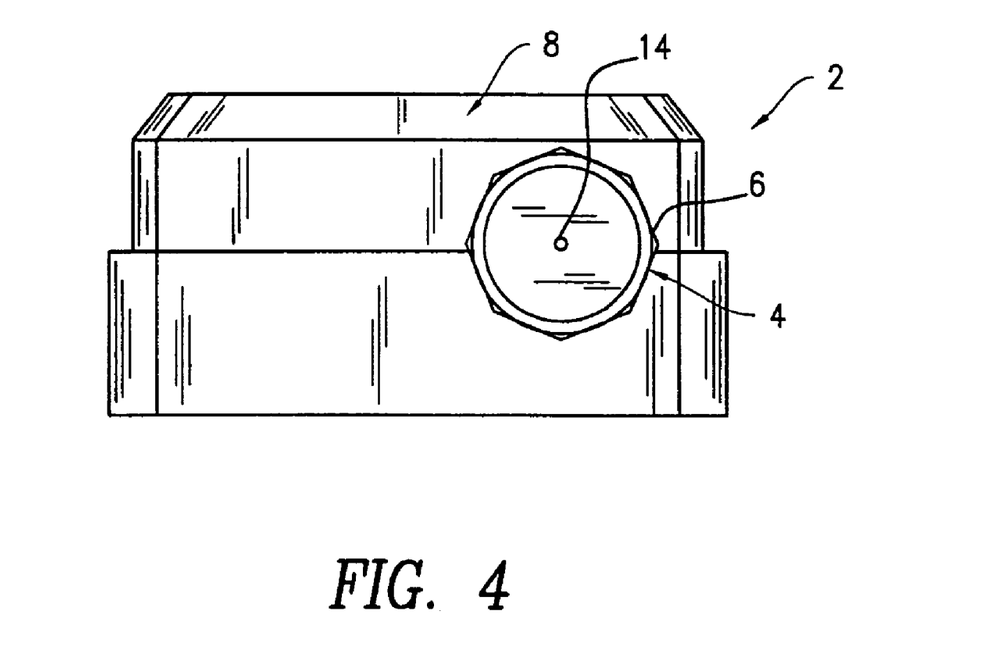
FIG. 4 is a top plan view of the splitter of FIG. 1.

With reference to FIG. 1, a 75 ohm cable television splitter 2 includes a housing 8 that has a male connector 4 with a captive rotatable nut 6 for securing the connector 4 to a female port of another device, for receiving a video input signal into the splitter 2. Also included on the bottom of the splitter 2 are two female output ports, 10 and 12. In the preferred embodiment of the invention, the male connector 4 is provided by a 75 ohm F-59 type male connector, and the female ports or connectors 10 and 12 are typical F-port or F-type 75 ohm coaxial cable female connectors. Throughout each embodiment of the invention, it should be noted that all such male connectors are in the preferred embodiment F-59 type connectors, and all female connectors or ports are typical F-type or F-port female connectors. FIG. 2 shows another pictorial diagram of the splitter 2 looking from a different angle, whereby the center pin 14 of the male connector 4 is shown protruding therefrom. As is known in the art, the pin 14 is a center conductor for mating with the centrally located female pin of a female port or connector, in this case an F-type port or F-type female connector. FIGS. 3 and 4 show bottom and top plan views of the splitter 2. Note that the configuration of the housing 8, as shown, is not meant to be limiting, whereby the various embodiments of the invention described herein are meant to be associated with any practical housing configuration for a splitter, or amplifier.

Figure 5:
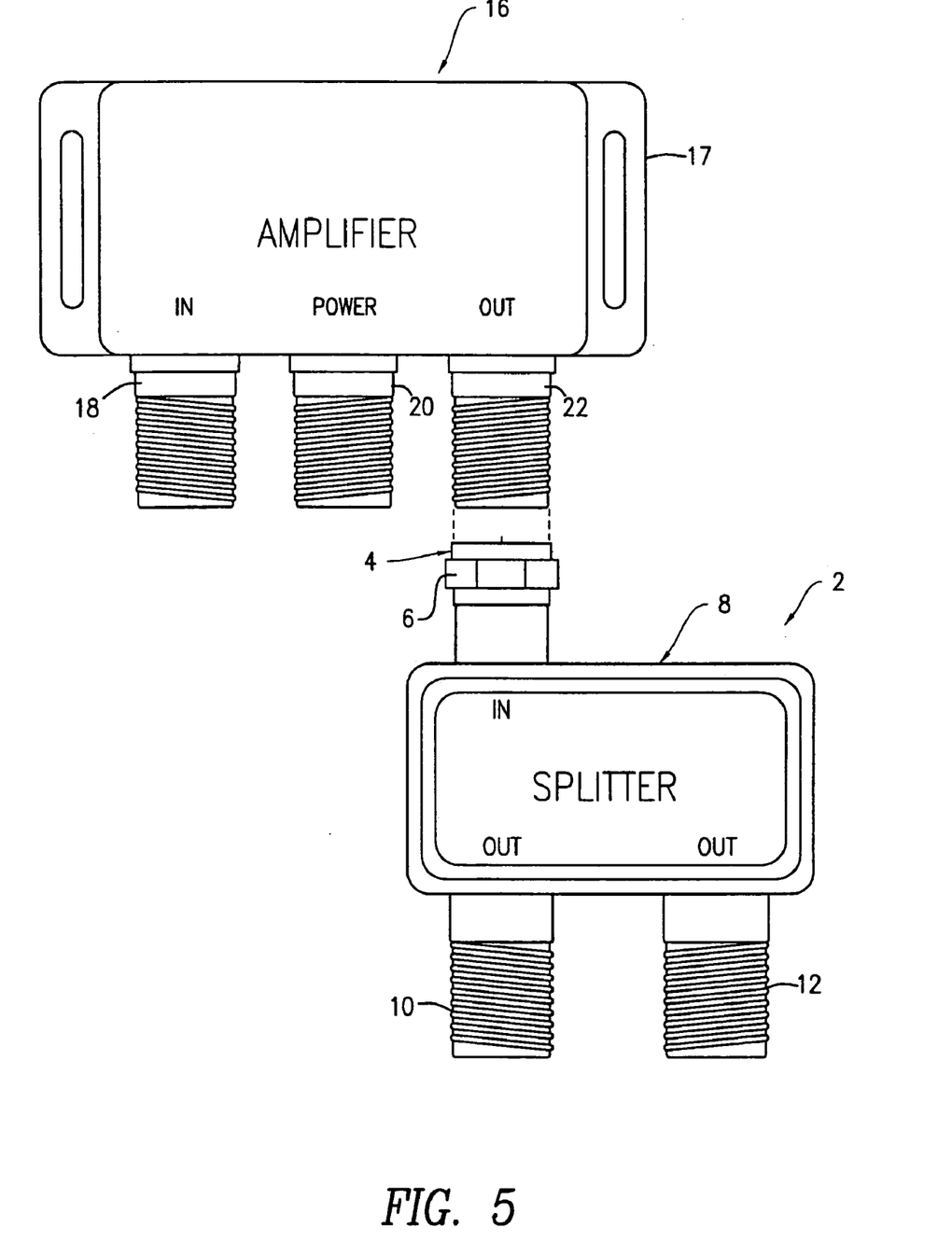
FIG. 5 is an exploded assembly view showing the splitter of FIG. 1 aligned for connection to the output port of a video amplifier.

FIG. 5 shows an exploded assembly view of the splitter 2 aligned for interconnection to the output F-port or F-type female port 22 of an amplifier 16, in this example. To complete the connection, as is known to those of skill in the art, the splitter 2 is moved upward for causing the center pin 14 to engage the female socket of the female connector 22, in this example, whereafter, the nut 6 is rotated in a clockwise direction, for example, for securing the male connector 4 to the female connector 22 for completing the electrical and mechanical connection therebetween. Note further that the amplifier 16 in this example includes two other female F-type connectors, a connector 18 providing an input port, and a connector 20 providing a power port. The amplifier 16 also includes a housing 17 that can be of any desired configuration.

Figure 6:
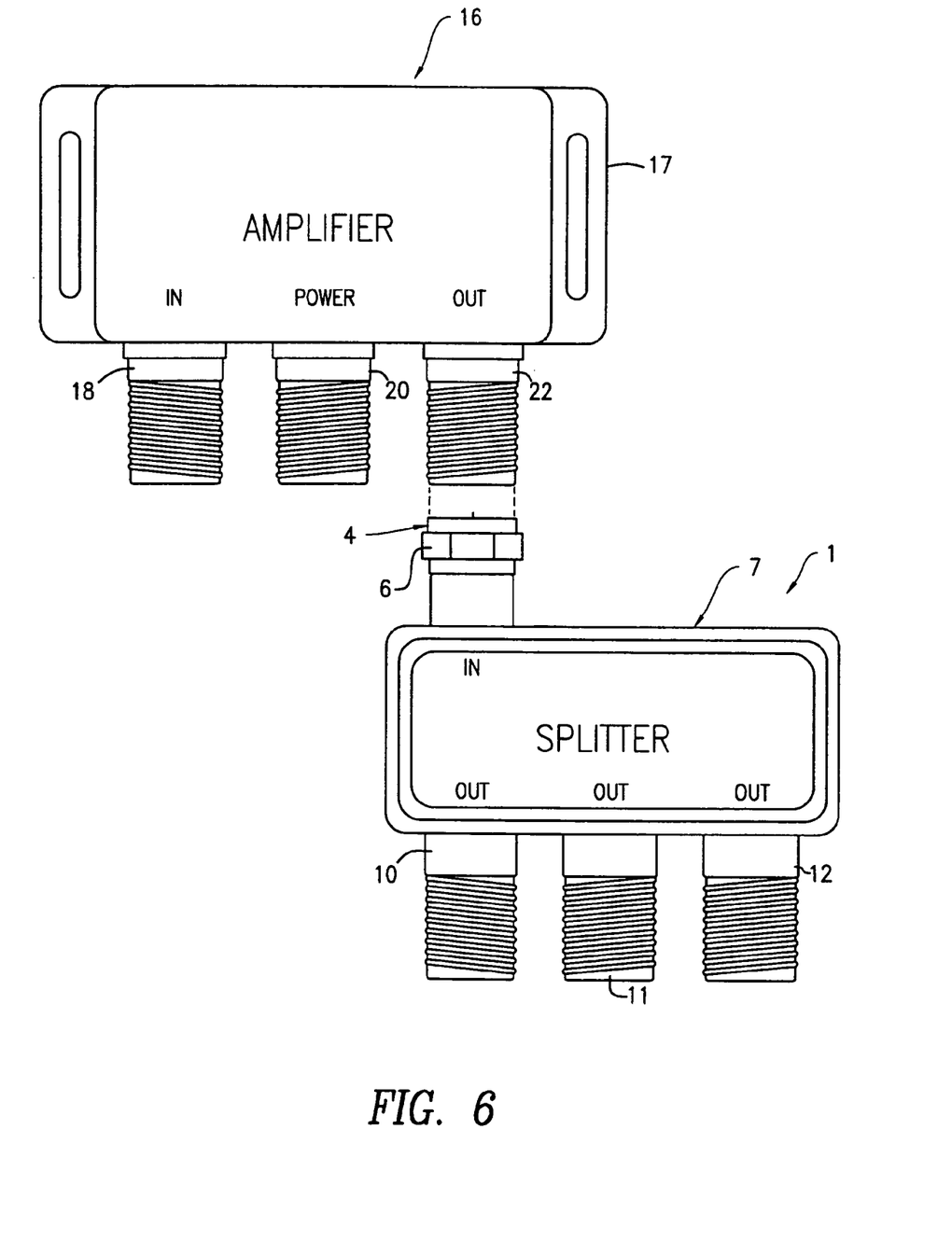
FIG. 6 shows an embodiment of the invention incorporating a splitter having three female output ports, and a male input port, aligned in an exploded assembly view for connection to the female output port of a video amplifier.

In FIG. 6 another embodiment of the invention is shown, in an exploded assembly view, whereby the splitter 1 includes three female output ports 10, 11, and 12. Also included is an input port provided by a male connector 4, located as shown and as previously described, for use in the splitter 2 of FIG. 1.

Figure 7:
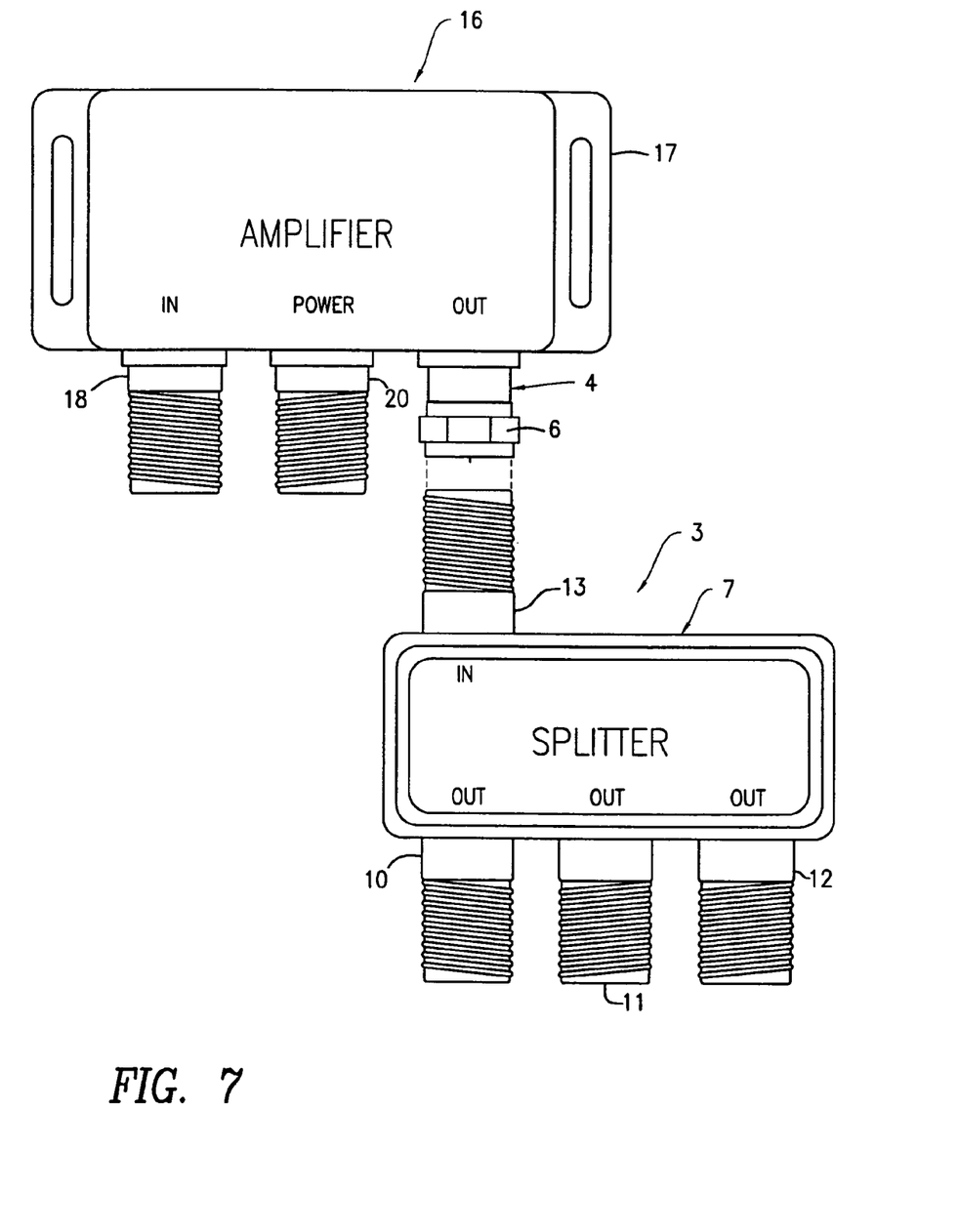
FIG. 7 shows another embodiment of the invention for connection of a standard multi-output splitter having a female input connector to a video amplifier incorporating a male output connector with a captive nut.

In FIG. 7 another embodiment of the invention is shown in an exploded assembly diagram. More specifically, in this example, the typical splitter 3 includes a housing 7, female ports 10, 11, and 12, and a female input port 13, as shown. In this embodiment, the amplifier 16 includes a male connector 4 for providing the output port, the latter being as previously described, for direct coupling to the female input port 13 of the splitter 3, in this example.

Figure 8:
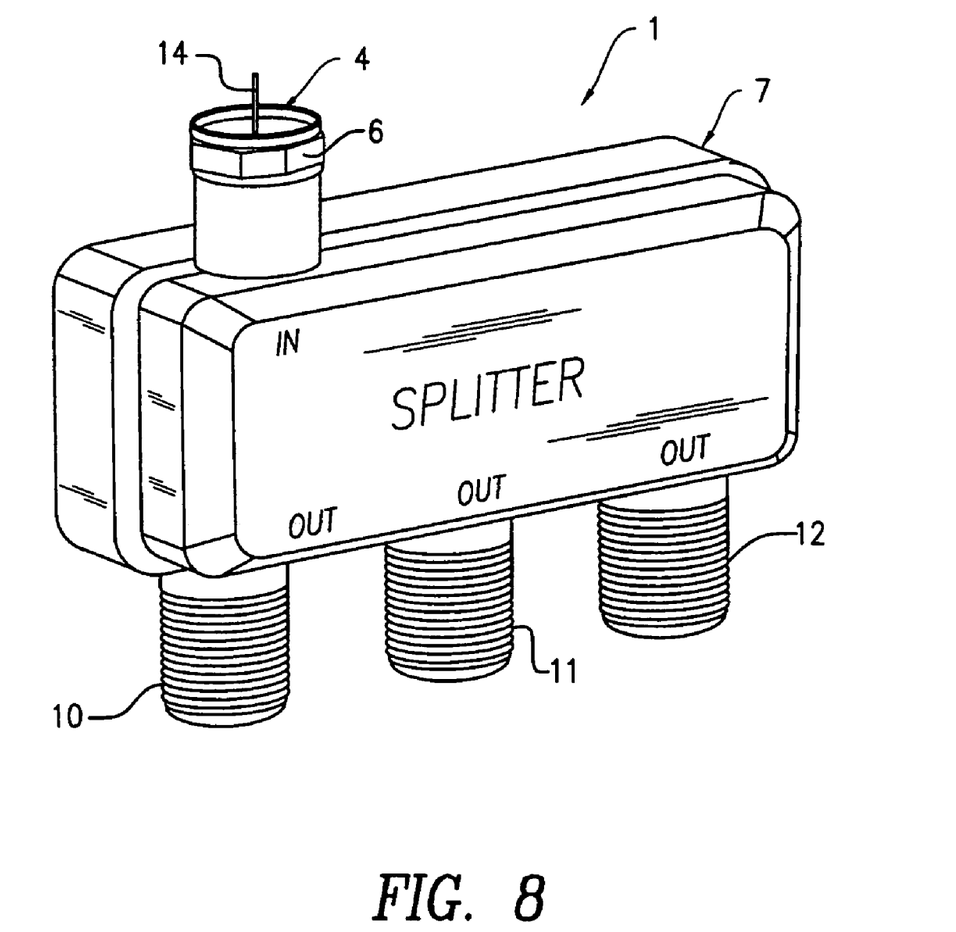
FIG. 8 shows a pictorial view of a splitter having three female output ports, and a male input port, for an embodiment of the invention.

In FIG. 8 a pictorial diagram is shown of a splitter 1 that includes three female ports 10, 11, and 12, and a male connector 4. This splitter is identical as the splitter 1 for the embodiment of the invention of FIG. 6, that includes a housing 7.

Figure 9:
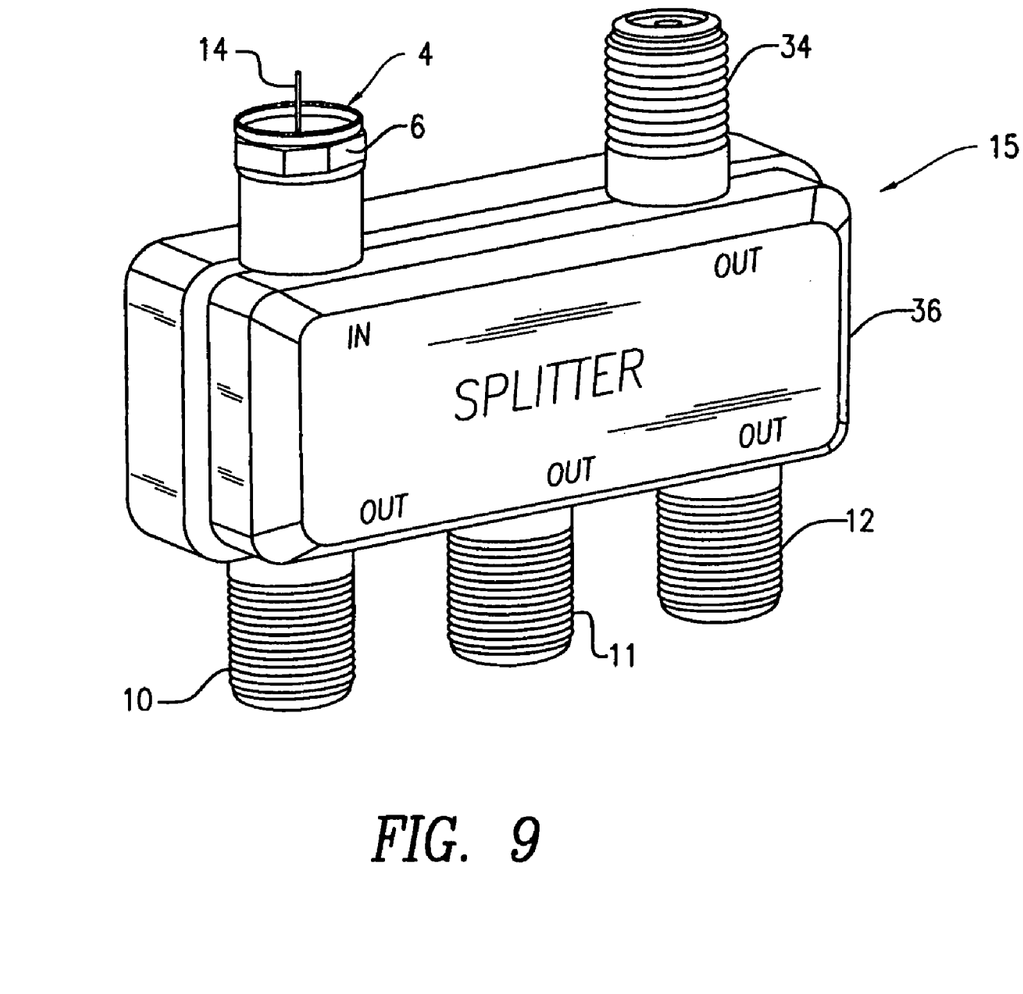
FIG. 9 shows a splitter having four female output ports and a male input port for another embodiment of the invention.

In FIG. 9 another embodiment of the invention is for a four output splitter 15 including female ports 10, 11, 12, and 34 as shown, as associated with a housing 36, and a male input connector 4, as previously described in other embodiments. Note that the various embodiments of the invention are not meant to be limited to splitters with any given number of female output ports. The various different splitters with different numbers of female output ports as illustrated herein are meant for purposes of illustrating the broad use of the present invention for providing direct connector couplings between splitters and amplifiers used in cable television applications. In this regard, note that the female ports may be integrally molded into the housing, or provided as screw-in type connectors into the housing, as would be known to those of skill in the art. Splitter 15 is shown to include a housing 36.

Although various embodiments of the invention have been shown and described, they are not meant to be limiting. Those of skill in the art may recognize certain modifications to these embodiment, which modifications are meant to be covered by the spirit and claims of the appended claims.

What I claim is:

1. In a cable television system, the combination comprising:
    a video splitter including:
        a housing;
        at least two output ports; and
        an input port on said housing for receiving video/audio/data signals, said input port being provided by a male coaxial connector with a captive rotatable nut; and
    a video amplifier including:
        a housing;
        a first port being an output port on said housing for outputting video/audio/data signals, said first port being provided by a female coaxial connector, for directly securing electrical and mechanical coupling to the male connector of the input port of said video splitter without use of coaxial cable therebetween;
        a second port for power; and
        a third port for receiving an input signal.

2. The combination of claim 1, wherein said male connector is a 75 ohm coaxial F-59 type connector, and said female connector is an F-type.

3. The combination of claim 1, wherein said video splitter further includes:
    said at least two output ports consisting of female connectors.

4. The combination of claim 1, further including:
    said first port of said video splitter being provided by a male F-59 type 75 ohm connector; and
    said first port of said amplifier being provided by an F-type female connector.

5. The combination of claim 4, wherein said at least two output ports of said video splitter each consist of an F-type female connector.

6. In a cable television system, the combination comprising:
    a video amplifier including:
        a housing;
        a first port being an output port on said housing for outputting video/audio/data, said first port being provided by a male connector with a captive rotatable nut;
        a second port for power;
        a third port for receiving an input signal; and
    a video splitter including:
        a housing;
        at least two output ports; and
        an input port on said housing for receiving video/audio/data signals, said input port being provided by a female connector, for directly securing electrical and mechanical coupling to the male connector of said video amplifier without use of coaxial cable therebetween.

7. The combination of claim 6, wherein said male connector is a 75 ohm coaxial F-59 type connector, and said female connector is an F-type.

8. The combination of claim 6, wherein said at least two output ports of said video splitter each consist of an F-type female connector.

9. In a cable television system, the combination comprising:
    a first device including:
        a housing; and
        a first port on said housing for the passage of video/audio/data signals provided by a male connector with a captive rotatable nut; and
    a second device including:
        a housing; and
        a first port on said housing for the passage of video/audio/data signals provided by a female connector, for directly receiving and securing electrical and mechanical coupling to the male connector of said first device via the direct connection of said male connector to said female connector without use of a coaxial cable therebetween;
    wherein said first device being a video splitter, said first port being an input port; and second device being a video amplifier with its first port providing an output port;
    wherein said male connector is a 75 ohm coaxial F-59 type connector, and said female connector is an F-type.

10. The combination of claim 9, wherein said video splitter further includes:
    a plurality of second ports consisting of female ports, respectively, each providing an output.

11. The combination of claim 9, further including:
    said first port of said video splitter being provided by a male F-59 type 75 ohm connector; and
    said first port of said amplifier being provided by an F-type female connector.

12. The combination of claim 11, wherein said video splitter further includes a plurality of second ports each consisting of an F-type female connector, and each providing an output.

13. The combination of claim 9, wherein said video amplifier further includes a second port for power, and a third port for receiving an input signal.

* * * * *